(12) United States Patent
Keith et al.

(10) Patent No.: US 11,156,832 B1
(45) Date of Patent: Oct. 26, 2021

(54) SYSTEMS AND METHODS FOR MULTICOLOR DISPLAY WITH LARGE FIELD OF VIEW

(71) Applicant: Rockwell Collins, Inc., Cedar Rapids, IA (US)

(72) Inventors: Christopher A. Keith, Wilsonville, OR (US); Eric P. Stratton, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/216,779

(22) Filed: Dec. 11, 2018

(51) Int. Cl.
| | |
|---|---|
| *G02B 27/00* | (2006.01) |
| *G02B 27/01* | (2006.01) |
| *G02B 5/18* | (2006.01) |
| *F21V 8/00* | (2006.01) |
| *G02B 6/12* | (2006.01) |

(52) U.S. Cl.
CPC .......... *G02B 27/0101* (2013.01); *G02B 5/18* (2013.01); *G02B 6/0033* (2013.01); *G02B 27/0172* (2013.01); *G02B 2006/12107* (2013.01); *G02B 2027/0125* (2013.01)

(58) Field of Classification Search
CPC .. G02B 27/0101; G02B 27/0172; G02B 5/18; G02B 6/0033; G02B 6/0035; G02B 2027/0125; G02B 2006/12107
USPC ............................................. 359/13, 34, 630
See application file for complete search history.

(56) References Cited

U.S. PATENT DOCUMENTS

| | | |
|---|---|---|
| 5,856,842 A | 1/1999 | Tedesco |
| 8,233,204 B1 | 7/2012 | Robbins et al. |
| 9,523,852 B1 | 12/2016 | Brown et al. |
| 10,191,288 B2 * | 1/2019 | Singer ................ G02B 27/0172 |
| 2014/0140653 A1 | 5/2014 | Brown et al. |
| 2020/0116997 A1 * | 4/2020 | Lee ....................... G02B 6/0035 |

* cited by examiner

*Primary Examiner* — Audrey Y Chang
(74) *Attorney, Agent, or Firm* — Suiter Swantz pc llo

(57) ABSTRACT

A first waveguide of the HUD includes a first input coupler and a first output coupler. The first input coupler is configured to receive first light in a first bandwidth and provide the first light to the first output coupler. The first output coupler is configured to provide the first light in a first field of view. The first input coupler is configured to receive second light in a second bandwidth and provide the second light to the first output coupler. A second waveguide of the HUD includes a second input coupler and a second output coupler. The second input coupler is configured to receive third light in the first bandwidth and provide the third light to the second output coupler. The second output coupler is configured to provide the third light in the second field of view.

12 Claims, 4 Drawing Sheets

SYSTEMS AND METHODS FOR MULTICOLOR DISPLAY WITH LARGE FIELD OF VIEW

BACKGROUND

Embodiments of the inventive concepts disclosed herein relate generally to the field of displays. Embodiments of the inventive concepts disclosed herein more specifically relate to head up displays (HUDs), including but not limited to, head worn displays (HWDs), fixed HUDs, near eye displays, and helmet mounted displays (HMDs).

HUDs provide information that is viewable in virtual space for the operation of equipment, such as aircraft, ships, boats, naval crafts, medical equipment, robotic equipment, remote vehicles, unmanned vehicle systems ("UVS"), training simulators, entertainment systems, military equipment, land vehicles, etc. The information can include navigation parameters, guidance parameters, equipment parameters, location information, video information, target information, remote views, symbology, etc.

HUDs can be used to overlay display symbology (e.g., one or more symbols) onto scenes viewable out of a window or other port. The symbols are intended to represent or enhance features in the view of the user and are projected by a projector to a combiner. U.S. Patent Publication No. 2014/0140653, incorporated herein by reference in its entirety, discloses displays using waveguide technology. U.S. Pat. Nos. 5,856,842 and 8,233,204, incorporated herein by reference in their entireties, provide systems where light is coupled into a waveguide by employing a diffractive element at the input and coupled out of the same waveguide by employing a second diffractive element at the output. A waveguide display having a wide field of view, full color, and superior image quality is desired.

SUMMARY

In one aspect, embodiments of the inventive concepts disclosed herein are directed to a HUD. The HUD can be a worn display, an HMD, an HWD, a fixed HUD, a near eye display, etc. The HUD includes a first waveguide and a second waveguide. The first waveguide includes a first input coupler and a first output coupler. The first input coupler is configured to receive first light in a first bandwidth and provide the first light to the first output coupler. The first output coupler is configured to provide the first light in a first field of view. The first input coupler is configured to receive second light in a second bandwidth and provide the second light to the first output coupler. The first output coupler is configured to provide the second light in a second field of view which is spatially separate from the first field of view. The second waveguide includes a second input coupler and a second output coupler. The second input coupler is configured to receive third light in the first bandwidth and provide the third light to the second output coupler. The second output coupler is configured to provide the third light in the second field of view.

In another aspect, embodiments of the inventive concepts disclosed herein are directed to a display. The display includes a projecting system and a waveguide system. The projecting system is configured to provide a first image of a first color for a first field of view, a second image of a second color for a second field of view, a third image of a third color for a third field of view, a fourth image of the first color for the second field of view, a fifth image of the second color for the third field of view, a sixth image of the third color for the first field of view, a seventh image of the first color for the third field of view, an eighth image of the second color for the first field of view, and a ninth image of the third color for the second field of view. The waveguide system includes a first layer, a second layer, and a third layer. The first layer includes a first set of first input diffraction gratings and first output diffraction grating. The first layer provides the first image in the first field of view, the second image in the second field of view and the third image in the third field of view. The second layer includes a second set of second input diffraction gratings and a reciprocal second output diffraction grating. The second layer provides the fourth image in the second field of view, the fifth image in the third field of view and the sixth image in the first field of view. The third layer includes a third set of third input diffraction gratings and a reciprocal output diffraction grating. The third layer provides the seventh image in the third field of view, the eighth image in the first field of view and the ninth image in the second field of view.

In a further aspect, embodiments of the inventive concepts disclosed herein are directed to a method of providing a color image on a combiner of a head up display (HUD). The method includes providing a first image of a first color for a first field of view to a first input coupler of a first waveguide, and providing the first image from a first output coupler of the first waveguide. The method also includes providing a second image of a second color for the first field of view to a second input coupler of a second waveguide, and providing the second image from a second output coupler of the second waveguide. The method also includes providing a third image of the second color for a second field of view to the first input coupler of the first waveguide, and providing the third image from the first output coupler of the first waveguide.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
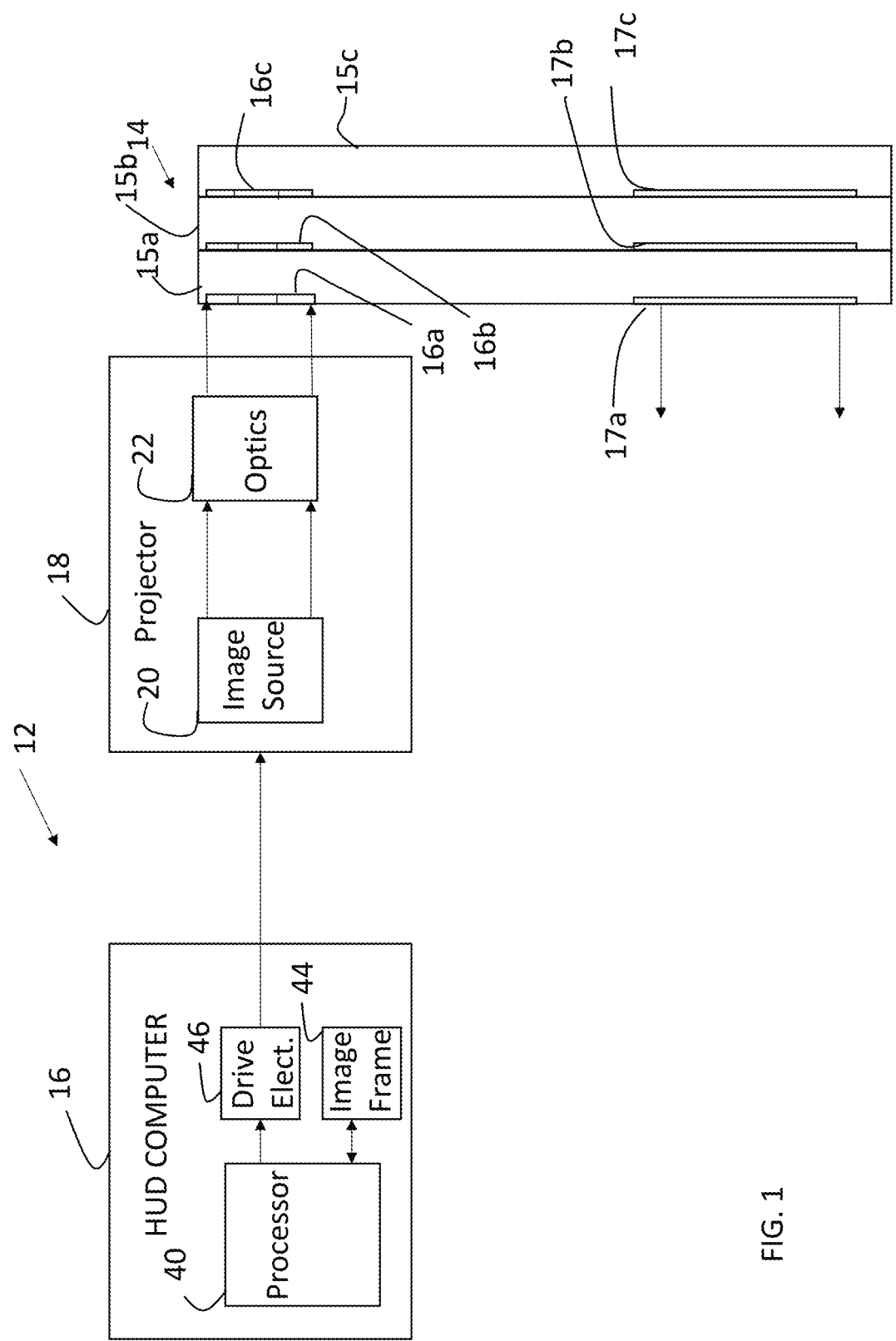
FIG. 1 is a schematic general block diagram a HUD in accordance with the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Systems and methods according to the inventive concepts disclosed herein are configured to provide a large field of view, color display. Advantageously, the systems and methods provide a field of view of greater than 40 degrees in diagonal (e.g., 40-50 degrees). In some embodiments, a tiled, waveguide display including three layers provides full color and does not require six or more layers or waveguides. The larger number of layers or waveguides adds to expense and complexity, and degrades image qualities (e.g., adversely effects brightness and haze). In some embodiments, a HUD has an advantageous arrangement of input couplers and output couplers to achieve a full color large field of view with fewer waveguides or layers.

In some embodiments, the systems and methods are used in a holographic or diffractive waveguide display. In some embodiments, a large field of view is achieved by tiling fields of view in a single waveguide with each tiled field of view corresponding to a separate wavelength or wavelength band. In some embodiments, two waveguides with tiled field of views corresponding to wavelengths are stacked in a complementary fashion so that appropriate wavelength tiles are overlapped to provide color images. In some embodiments, three waveguides with tiled field of views corresponding to wavelengths are stacked in a complementary fashion so that appropriate wavelength tiles are overlapped to provide full color images. The systems and methods can be used in virtual reality (VR), augmented reality (AR), mixed reality (MR) and extended reality (XR) systems.

Referring to FIG. 1, a display system 12 can be an eyewear mounted display system, an HWD system, a near eye display system, a fixed combiner HUD, a helmet mounted display, or other worn display device. The display system 12 includes a combiner 14, a HUD computer 16, and a projector 18. The projector 18 and combiner 14 can be packaged for use in small volume displays, such as HMDs and other worn displays.

The HUD computer 16 includes a processor 40, an image frame memory 44 and drive electronics 46. The HUD computer 16 provides an image frame stored in the image frame memory 44 for an image to be provided on the combiner 14. The image frame is associated with a desired image as determined by the HUD computer 16 based upon pilot selections, sensor inputs, HUD processing software and other information. The image frame can include multiple frames for each field of view and each color.

The projector 18 includes an image source 20 and collimating optics 22. The image source 20 provides the optical image which is collimated by the collimating optics 22 for display on the combiner 14. The collimating optics can be optics similar to the optics described in U.S. Pat. No. 9,523,852, incorporated herein by reference in its entirety.

The image frame stored in the image frame memory 44 is provided to drive electronics 46, which provide drive signals to the image source 20. The image frame memory 44 are any storage device or a number of devices for storing data associated with providing an image. The drive electronics are video or graphics processing circuits that convert image data into signals for driving the image source 20 in some embodiments. The image frame memory 44 includes two or three color images (e.g., red, green, and yellow) for each tiled field of view in some embodiments. The HUD computer 16 provides image data to the projector 18 for each color and each field of view, and the projector 18 provides drive signals in response to the image data so that the projector 18 provides the image on the combiner 14.

The image source 20 is a laser-illuminated liquid crystal display (LCD) or digital light processor display in some embodiments. The image source can include three different laser sources, one for each color, in some embodiments. The collimating optics 22 are disposed between the combiner 14 and the image source 20. The collimating optics 22 can be a single optical component, such as a lens, or include multiple optical components. In some embodiments, the collimating optics 22 are configured as a catadioptric collimator. The collimating optics 22 are integrated with or spaced apart from image source 20 and/or combiner 14 in some embodiments.

Light in accordance with the images from the projector 18 is provided to the combiner 14 via the collimating optics 22. For full color, each color is provided in each of three fields of view which are combined for a full image. The light is provided as nine images in three different colors and three different fields of view for full color, as six images in two different colors and three different fields of view for less than full color, or four images in two different colors and two different fields of view for less than full color in some embodiments. The colors are provided at a single wavelength or in a bandwidth of wavelengths associated with a color. The projector 18 uses the red, blue, and green color model or other color model for full color in some embodiments. The colors are provided using laser light at a particular wavelength for each color or by using filtered light, colored light emitting diodes (LEDs), or other light sources. In some embodiments, the three fields of view are negative 15 to negative 5 degrees, negative 5 to positive 5 degrees, and positive 5 degrees to positive 15 degrees.

In a two-color system, two image sources 20, one for each color, can be included in the projector 18, the projector 18 can provide each color image frame sequentially, one for each color, or two projectors 18, one for each color, can be utilized. Similarly, in a three or more color systems, three or more image sources 20 or projectors 18 can be utilized or image frames can be provided sequentially for each color.

The light is provided to the combiner 14 via the collimating optics 22. The combiner 14 includes three layers or waveguides 15a, 15b, and 15c for a three color system. For a two color system, only two waveguides or layers are used in some embodiments. Each of the waveguides 15a-c includes a respective input coupler 16a-c and a respective output coupled 17a-c. The input couplers 16a-c each provide three images associated with three colors and three different fields of view for travel by total internal reflection through the respective waveguides 15a-c for ejection by the output couplers 17a-c. The output couplers 17a-c each provide the three images in the three fields of view. The three fields of view are spatially separate from each other in some embodiments. The combiner 14 is configured so that each field of view includes each color image where each color image is provided by a different output coupler 17a-c. Accordingly, a full color image is provided for each field of view in some embodiments.

The output couplers 17a-c overlay each other in some embodiments. In some embodiments, the input couplers 16a-c do not over lay each other. In some embodiments, the input couplers 16a-c overlap each other. In some embodiments, the input couplers 16a-c and output couplers 17a-c are reflective arrays or gratings.

In some embodiments, the input couplers 16a-c each include a set of three diffraction gratings. Each of the diffraction gratings has a prescription for providing the appropriate field of view for the appropriate color. The prescription of the diffraction grating is chosen for appropriate field of view and color. For example, K vector, spacing, slanting, depth of duty cycle, index of refraction, and orientation can be chosen appropriate field of view and color. In some embodiments, the input couplers 16a-c are sets of diffraction gratings that are reciprocal gratings to the diffraction gratings of the output couplers 17a-c. The sets of gratings are multiplexed together in some embodiments.

In some embodiments, the diffraction gratings are Bragg gratings. In some embodiments, the diffractive gratings are surface relief gratings in a high refractive index (e.g., N>1.6) dielectric materials or holographic gratings. In some embodiments, diffraction gratings for the output couplers 17a-c have a lower efficiency for effecting pupil expansion and a larger area than the gratings for the input couplers 16a-c. A beam splitting coating is provided in each of the waveguides 15a-c between a front main surface and a back main surface and between the input couplers 16a-c and the output couplers 17a-c to increase the number of rays propagating to the output couplers 17a-c.

Figure 2:
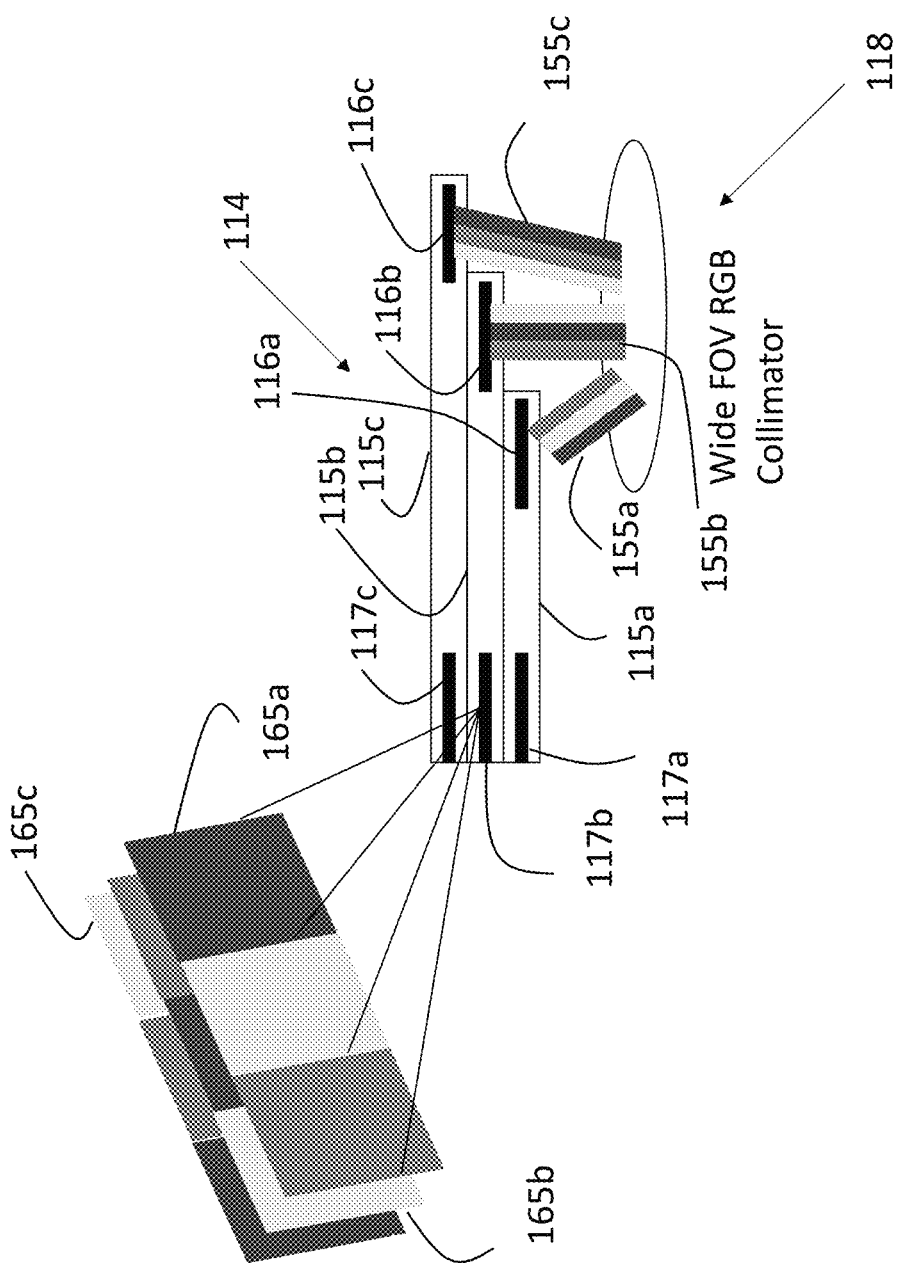
FIG. 2 is a schematic general block diagram of an exemplary waveguide combiner and projector for the HUD illustrated FIG. 1 in accordance with the inventive concepts disclosed herein.

With reference to FIG. 2, a collimator 118 can be used as the projector 18 discussed with reference to FIG. 1. The collimator 118 is a wide field of view red, green blue collimator in some embodiments. The collimator 118 provides three images 155a-c to a waveguide combiner 114 which can be used as the combiner 14 discussed with reference to FIG. 1.

The combiner 114 includes three layers or waveguides 115a, 115b, and 115c for a three color system. For a two color system, only two waveguides or layers are used in some embodiments. Each of the waveguides 115a-c includes a respective input coupler 16a-c and a respective output coupled 117a-c. The layers or waveguides 115a-c are similar to the layers or waveguides 15a-c (FIG. 1), the input couplers 116a-c are similar to the input couplers 16a-c (FIG. 1), and the output couplers are similar to the output couplers 117a-c (FIG. 1) in some embodiments. The input couplers 16a-c each provide a respect image 155a-c associated with three colors and three different fields of view for travel by total internal reflection through the respective waveguides 115a-c for ejection by the output couplers 117a-c. The output couplers 117a-c provide respective images 165a-c. In some embodiments, each of the images 155a-c is a full color image provided to all three fields of view and the input-couplers 116a-c select the color for the appropriate transmission to the output couplers 117a-c as the images 165a-c.

Each of the images 165a-c is a three color image in the three fields of view (e.g., where each color is segregated into a separate field of view). The combiner 114 is configured so that each field of view includes a different color image form each of the images 165a-c, where each color image is provided by a different output coupler 117a-c. Accordingly, a full color image (e.g., a white uniform image) is provided for each field of view in some embodiments. The images 165a-c correspond to the images 155a-c. The output couplers 117a-c overlay each other so that each field of view contains all three color images. For example, the red image for the image 165a is in the same field of view (the center field of view) of the blue image for the image 165b, and the green image for the image 165c, the red image for the image 165b is in the same field of view (the right field of view) of the blue image for the image 165c, and the green image for the image 165a, and the red image for the image 165c is in the same field of view (the left field of view) of the blue image for the image 165a, and the green image for the image 165b.

In some embodiments, the input couplers 116a-c each include a set of three diffraction gratings for providing the appropriate color image to the appropriate field of view. For example, K vector, spacing, and orientation can be chosen appropriate field of view and color associated with the images 155a-c. The output couplers 117a-c each include a diffraction grating (e.g., reciprocal to the set of three diffraction gratings for the input couplers 116a-c) providing the appropriate color image to the appropriate field of view. For example, K vector, spacing, and orientation can be chosen for an appropriate field of view and color associated with the images 165a-c. In some embodiments, the spacing is different from each other for each different grating in the set of each of the input couplers 116a-c. The different gratings for each of the output couplers 117a-c have a uniform spacing within the grating, but can be different from other gratings of the output couplers 117a-c in some embodiments. The diffraction grating for each output coupler 117a-c can have a varying duty cycle, depth, K vector along as its length (e.g., for adjusting efficiency and color response).

Figure 3:
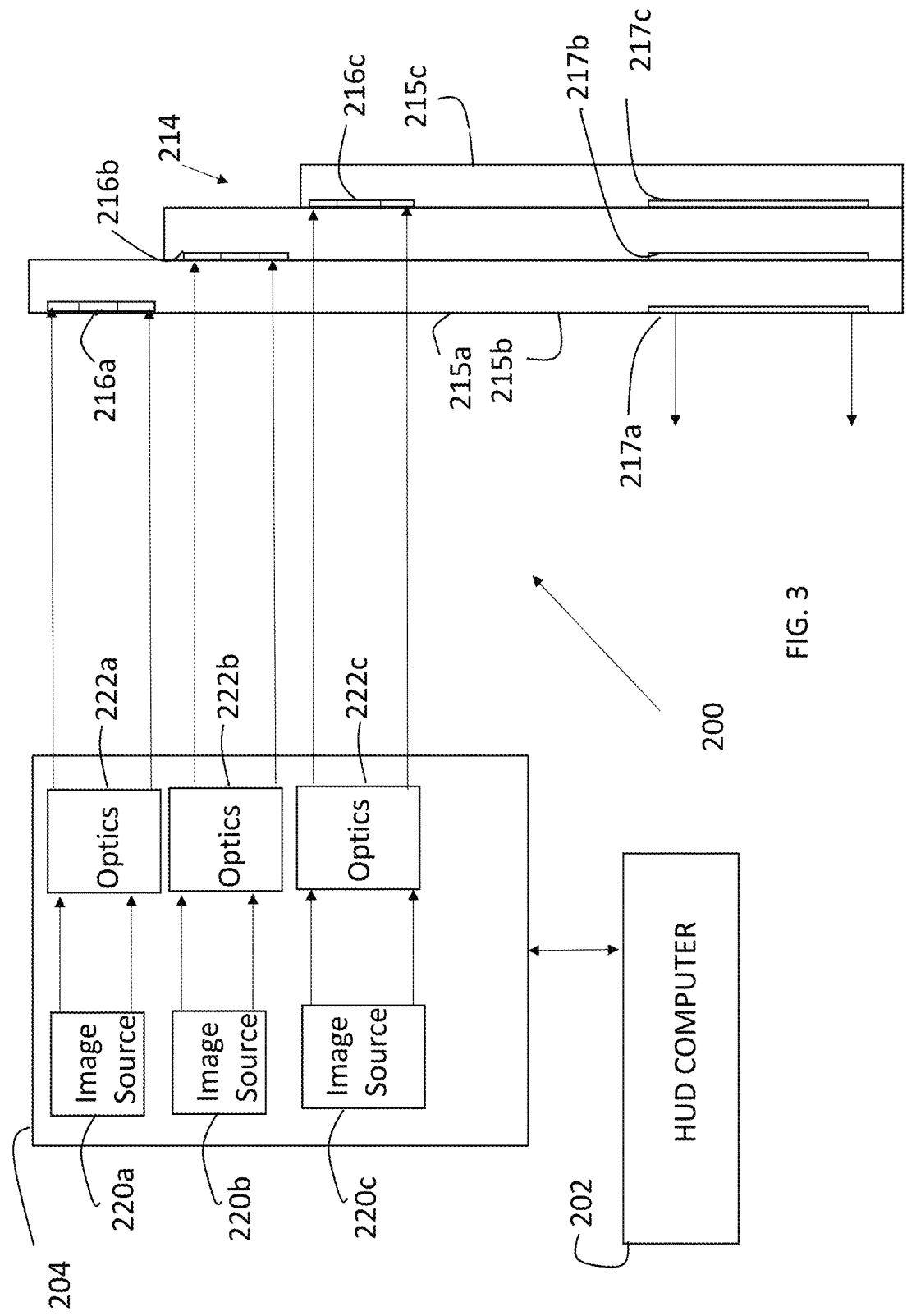
FIG. 3 is a schematic general block diagram of a HUD in accordance with the inventive concepts disclosed herein.

Referring to FIG. 3, a display system 200 is similar to the display system 12 discussed with reference to FIG. 1. The display system 200 can be an eyewear mounted display system, an HWD system, a near eye display system, a fixed combiner HUD, a helmet mounted display, or other worn display device. The display system 200 includes combiner 214, a HUD computer 202, and a projector 204. The projector 204 and combiner 214 can be packaged for use in small volume displays, such as HMDs and other worn displays.

The HUD computer 202 is similar to the HUD computer 16 discussed with reference to FIG. 1. The HUD computer 202 provides image frames for the projector 204 based upon pilot selections, sensor inputs, HUD processing software and other information in some embodiments.

The projector 204 is similar to the projector 18 in some embodiments. The projector 204 includes three image sources 220*a-c* configured to provide three color images (e.g., the images 155*a-c* of FIG. 2) and three collimators 222*a-c* associated with the image sources 220*a-c*. The image sources 220 *a-c* are similar to the image source 20 (FIG. 1) and the collimators 222*a-c* are similar to the collimating optics 22. The image sources 220*a-c* are laser-illuminated liquid crystal displays (LCDs) or digital light processor displays in some embodiments.

The combiner 214 includes three layers or waveguides 215*a*, 215*b*, and 215*c* for a three color system. Each of the waveguides 215*a-c* includes a respective input coupler 216*a-c* and a respective output coupled 217*a-c*. The input couplers 216*a-c* each provide three images associated with three colors and three different fields of view for travel by total internal reflection through the respective waveguides 215*a-c* for ejection by the output couplers 217*a-c*. The input couplers 216*a-c* do not overlap in some embodiments. The output couplers 217*a-c* overlay each other in some embodiments.

In some embodiments, the input couplers 216*a-c* each include a set of three diffraction gratings. Each of the diffraction gratings has a prescription for providing the appropriate field of view for the appropriate color. The prescription of the diffraction grating is chosen for appropriate field of view and color. For example, K vector, duty cycle, depth, spacing, and orientation can be chosen appropriate field of view and color. Filters can be provided for color selection for each of the diffraction gratings or the diffraction gratings can be selective to color.

Figure 4:
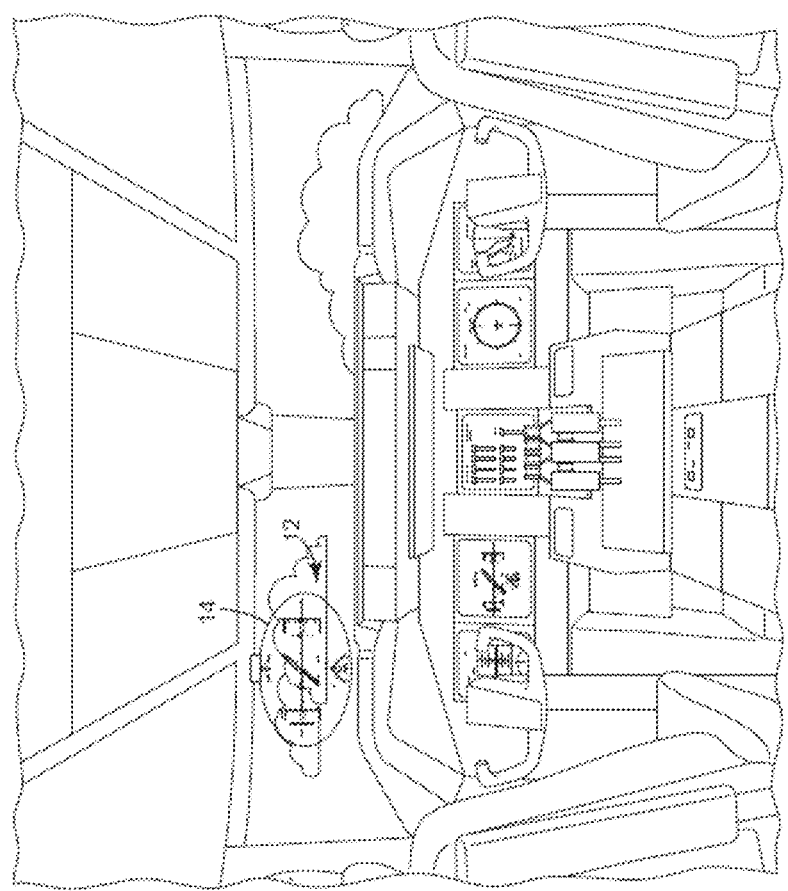
FIG. 4 is a schematic illustration of an aircraft control center including an exemplary embodiment of the HUD illustrated in FIG. 1 embodied as a fixed combiner HUD in accordance with the inventive concepts disclosed herein.

Referring now to FIG. 4, an illustration an aircraft control center 10 or cockpit is shown, according to some embodiments. The aircraft control center 10 includes the display system 12 embodied as a fixed display system. Although shown as a fixed display system in FIG. 1, the display system 12 can be an HMD system, an eyewear mounted display system, an HWD system, a near eye display system or other worn display device.

The display system 12 can be used to provide information to the flight crew in the aircraft control center 10, thereby increasing visual range and enhancing decision-making abilities. In some embodiments, the display system 12 provides HUD symbology, a weather display, a joint display, a weather radar map, a terrain display, images from a synthetic vision system (SVS), and images from an enhanced vision system (EVS) (e.g., an enhanced flight vision system EFVS). The display system 12 can be utilized in various applications including but not limited to aviation, medical, naval, targeting, ground-based vehicle, military, remote control, etc. In some embodiments, display system 12 is used in a cockpit, bridge, operating room, etc.

The combiner 14 is a fixed combiner in the aircraft control center 10 in some embodiments. In some embodiments, the combiner 14 is provided as part of a wearable HUD. The combiner 14 is a translucent or transparent combiner for viewing the real world scene through main surfaces of the combiner 14 in some embodiments.

Figure 5:
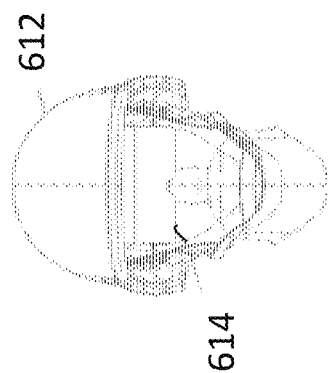
FIG. 5 is a schematic illustration of helmet including an exemplary embodiment of the HUD illustrated in FIG. 1 embodied as a helmet mounted display in accordance with the inventive concepts disclosed herein.

Referring now to FIG. 5, an illustration the display system 12 (FIG. 1) is embodied as a helmet worn display system 614. The helmet worn display system is used with a helmet 612. The display system 614 can be an eyewear mounted display system, a near eye display system or other worn display device. The display system 200 and the waveguide combiner 114 can be used in the configurations of FIGS. 4 and 5 in some embodiments.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A display, comprising:
a projecting system configured to provide a first image of a first color for a first field of view, a second image of a second color for a second field of view, a third image of a third color for a third field of view, a fourth image of the first color for the second field of view, a fifth image of the second color for the third field of view, a sixth image of the third color for the first field of view, a seventh image of the first color for the third field of view, an eighth image of the second color for the first field of view, and a ninth image of the third color for the second field of view; and
a waveguide system comprising:
a first layer comprising a first set of first input diffraction gratings and a reciprocal first output diffraction grating, wherein the first layer provides the first image in the first field of view, the second image in the second field of view and the third image in the third field of view;
a second layer comprising a second set of second input diffraction gratings and a reciprocal second output diffraction grating, wherein the second layer provides the fourth image in the second field of view, the fifth image in the third field of view and the sixth image in the first field of view; and
a third layer comprising a third set of third input diffraction gratings and a reciprocal third output diffraction grating, wherein the third layer provides the seventh image in the third field of view, the eighth image in the first field of view and the ninth image in the second field of view.

2. The display of claim 1, wherein a combination of the first second and third fields of view provides a combined image with a total field of view between 40 to 50 degrees in full color.

3. The display of claim 1, wherein the first output diffraction grating, the second output diffraction grating, and the third output diffraction grating overlay each other at an output portion of the first layer, the second layer, and the third layer.

4. The display of claim 1, wherein the waveguide system is configured for use as a helmet mounted combiner, a glass frame worn combiner, or a head worn combiner.

5. The display of claim 1, wherein the display is configured as a head up display (HUD).

6. The display of claim 5, wherein the HUD is configured as a head worn display (HWD), a fixed HUD, a near eye display, a glass frame worn display, or a helmet mounted display (HMD).

7. A method of providing a color image on a display, the method comprising:
providing a first image of a first color for a first field of view, a second image of a second color for a second field of view, and a third image of a third color for a third field of view to a first input diffraction grating of a first layer of a waveguide system;
providing the first image, the second image, and the third image from a reciprocal first output diffraction grating of the first layer of the waveguide system;
providing a fourth image of the first color for the second field of view, a fifth image of the second color for the third field of view, a sixth image of the third color for the first field of view to a second input diffraction grating of a second layer of the waveguide system;
providing the fourth image, the fifth image, and the sixth image from a reciprocal second output diffraction grating of the second layer of the waveguide system;
providing a seventh image of the first color for the third field of view, an eighth image of the second color for the first field of view, and a ninth image of the third color for the second field of view; to a third input grating of a third layer of the waveguide system; and
providing the seventh image, the eighth image, and the ninth image from a reciprocal third output diffraction grating of the third layer of the waveguide system.

8. The display of claim 7, wherein a combination of the first second and third fields of view provides a combined image with a total field of view between 40 to 50 degrees in full color.

9. The display of claim 7, wherein the first output diffraction grating, the second output diffraction grating, and the third output diffraction grating overlay each other at an output portion of the first layer, the second layer, and the third layer.

10. The display of claim 7, wherein the waveguide system is configured for use as a helmet mounted combiner, a glass frame worn combiner, or a head worn combiner.

11. The display of claim 7, wherein the display is configured as a head up display (HUD).

12. The display of claim 11, wherein the HUD is configured as a head worn display (HWD), a fixed HUD, a near eye display, a glass frame worn display, or a helmet mounted display (HMD).

* * * * *